(12) United States Patent
Duan et al.

(10) Patent No.: US 9,239,101 B2
(45) Date of Patent: Jan. 19, 2016

(54) ANGULAR MOTION CONTROL SYSTEM AND METHOD

(71) Applicant: Zedi Canada Inc., Calgary (CA)

(72) Inventors: Junfeng Duan, Edmonton (CA); Tokunosuke Ito, Calgary (CA)

(73) Assignee: Zedi Canada Inc., Edmonton Alberta (CA)

( * ) Notice: Subject to any disclaimer, the term of this patent is extended or adjusted under 35 U.S.C. 154(b) by 69 days.

(21) Appl. No.: 13/922,839

(22) Filed: Jun. 20, 2013

(65) Prior Publication Data

US 2014/0373651 A1    Dec. 25, 2014

(51) Int. Cl.
| | |
|---|---|
| *F16H 25/08* | (2006.01) |
| *F16H 25/12* | (2006.01) |
| *F16H 31/00* | (2006.01) |
| *F16H 25/20* | (2006.01) |

(52) U.S. Cl.
CPC ............... *F16H 25/08* (2013.01); *F16H 25/12* (2013.01); *F16H 31/001* (2013.01); *F16H 2025/2028* (2013.01); *Y10T 74/18576* (2015.01)

(58) Field of Classification Search
CPC ... F16H 25/08; F16H 3/10; F16H 2200/2082; F16D 41/067; F16D 47/02; F16D 67/00; F16D 41/00; F16D 41/07; F16D 13/04; F16D 13/06; B25B 15/06
USPC ............... 74/23, 24, 25, 88, 89, 89.23, 89.25, 74/89.38, 89.45, 99 R, 53–57, 126, 127; 192/45.001, 45.004, 45.005; 81/DIG. 2, 81/463
See application file for complete search history.

(56) References Cited

U.S. PATENT DOCUMENTS

| | | | | |
|---|---|---|---|---|
| 24,005 | A | * | 5/1859 | Brooks ........................... 74/127 |
| 133,994 | A | * | 12/1872 | Lakin ............................. 74/127 |
| 157,087 | A | * | 11/1874 | Allard ............................ 74/127 |
| 326,682 | A | * | 9/1885 | Sergeant ........................ 74/127 |
| 391,880 | A | * | 10/1888 | Cashin ........................... 74/127 |
| 392,541 | A | * | 11/1888 | Cullingworth ................. 74/127 |
| 490,152 | A | * | 1/1893 | Macomber ..................... 74/127 |
| 522,623 | A | * | 7/1894 | Sergeant ........................ 74/127 |
| 593,157 | A | * | 11/1897 | Furbish ............................ 81/62 |
| 598,681 | A | * | 2/1898 | Root ............................... 74/127 |
| 739,440 | A | * | 9/1903 | Oldham ......................... 173/111 |
| 756,388 | A | * | 4/1904 | May ............................... 74/127 |
| 771,218 | A | * | 9/1904 | Gilman .......................... 173/111 |
| 855,515 | A | * | 6/1907 | Kimman ........................ 173/97 |
| 1,034,010 | A | * | 7/1912 | Gilman .......................... 173/97 |
| 1,081,351 | A | * | 12/1913 | Waugh ........................... 173/97 |
| 1,103,002 | A | * | 7/1914 | Gilman et al. ................. 173/97 |

(Continued)

FOREIGN PATENT DOCUMENTS

| | | |
|---|---|---|
| CA | 2675497 | 2/2011 |
| CA | 2771458 | 2/2011 |

*Primary Examiner* — William Kelleher
*Assistant Examiner* — Thomas Magnuson
(74) *Attorney, Agent, or Firm* — Jones Walker LLP

(57) ABSTRACT

An apparatus and method for imparting an angularly rotational movement. The apparatus includes a cylinder having an internal portion, a rod operatively positioned within the internal portion of the cylinder, a first bearing operatively positioned about rod; a second unidirectional bearing operatively positioned about the rod and a motion program for selectively inputting incremental radial motion to the rod. The apparatus may also include a force generator for linearly moving the rod in a linear axial motion along an axis of the cylinder.

11 Claims, 5 Drawing Sheets

(56) References Cited

U.S. PATENT DOCUMENTS

| | | | | |
|---|---|---|---|---|
| 1,664,625 A * | 4/1928 | Hulshizer | | 74/127 |
| 1,806,874 A * | 5/1931 | Gilman | | 173/138 |
| 2,013,744 A * | 9/1935 | Curtis | | 173/96 |
| 2,041,319 A * | 5/1936 | Blomgren | | 123/56.8 |
| 2,124,627 A * | 7/1938 | Morrison | | 173/144 |
| 2,167,019 A * | 7/1939 | Yost | | 175/101 |
| 2,755,069 A * | 7/1956 | Mosby | | 173/97 |
| 2,944,431 A * | 7/1960 | Dexter | | 74/89 |
| 2,978,047 A * | 4/1961 | De Vaan | | 175/258 |
| 3,656,591 A * | 4/1972 | Marland et al. | | 188/82.84 |
| 4,036,309 A * | 7/1977 | Petreev et al. | | 173/103 |
| 4,232,770 A * | 11/1980 | Tuzson | | 192/41 R |
| 4,485,699 A * | 12/1984 | Fuller | | 81/59.1 |
| 4,577,522 A * | 3/1986 | Cox, Jr. | | 74/127 |
| 6,640,892 B1 | 11/2003 | Wright | | |
| 6,834,717 B2 | 12/2004 | Bland | | |
| 6,957,594 B2 * | 10/2005 | Yamada et al. | | 74/8 |
| 2004/0011532 A1 | 1/2004 | White | | |
| 2008/0035325 A1 | 2/2008 | Ali-zada et al. | | |
| 2013/0204204 A1* | 8/2013 | Butler et al. | | 604/211 |

* cited by examiner

ANGULAR MOTION CONTROL SYSTEM AND METHOD

This invention relates to an angular motion control system and method. More particularly, but not by way of limitation, this invention relates to precise and small angular motion control by the mechanical motion translation from linear to rotary motion program.

SUMMARY OF THE INVENTION

An apparatus for imparting an angularly rotational movement is disclosed. The apparatus comprises a cylinder having an internal portion, a rod operatively positioned within the internal portion of the cylinder, a first unidirectional bearing operatively positioned about the rod, and a second unidirectional bearing operatively positioned about the rod. The apparatus may also include means for selectively inputting incremental radial motion to the rod. In one embodiment, the apparatus further includes means for linearly moving the cylinder in a linear axial motion so that the rod is moved linearly along an axis of the cylinder. Additionally, the selective inputting means includes a groove operatively placed within the rod and a protuberance formed on the second unidirectional bearing. Also, the first bearing may contain a spline member on an outer diameter surface, and wherein the spline member is operatively attached to an inner diameter surface of the cylinder and wherein an inner diameter surface of the first bearing is attached to an outer diameter surface of the rod.

In one embodiment of the apparatus, an outer diameter surface of the second bearing is attached to the inner diameter of the cylinder and wherein the second bearing contains a spline member on an inner diameter surface, and wherein the spline member is operatively attached to the outer diameter surface of the rod. The inner diameter surface of the first bearing may be attached to the outer diameter surface of the rod by welding and the outer diameter surface of the second bearing may be attached to the inner diameter surface of the cylinder by welding. In one preferred embodiment, the first and second bearing rotates in a clockwise direction.

A system for imparting an angularly rotational movement is also disclosed. The system comprises: a cylinder having an internal portion; a rod operatively positioned within the internal portion of the cylinder; a first bearing operatively positioned about the rod; a second bearing operatively positioned about the rod; a motion assembly for turning the rod in preselected radial increments. The system may also include a linear force generator, operatively attached to the rod, so that the cylinder is moved linearly along an axis of the cylinder.

In one embodiment of the system, the motion assembly includes a groove operatively placed within the rod and a protuberance formed on the second unidirectional bearing. The first bearing may contain a spline member on an outer diameter surface, and wherein the spline member is operatively attached to an inner diameter surface of the cylinder; and wherein an inner diameter surface of the first bearing is attached to an outer diameter surface of the rod. In one preferred embodiment, an outer diameter surface of the second bearing is attached to the inner diameter of the cylinder and the second bearing contains a spline member on an inner diameter surface, and wherein the spline member is operatively attached to the outer diameter surface of the rod. Also, the first and second bearings are unidirectional so that rotation is allowed in only a single direction about a center axis of the rod.

A method for imparting an incremental radial movement is also disclosed. The method includes providing a system containing a cylinder having an internal portion; a rod operatively positioned within the internal portion of said cylinder; a first bearing operatively positioned about the rod; a second bearing operatively positioned about the rod; a groove operatively placed within the rod and a protuberance formed on the second unidirectional bearing; wherein the first bearing contains a spline member on an outer diameter surface, and wherein the spline member is operatively attached to an inner diameter surface of the cylinder; and wherein an inner diameter surface of the first bearing is attached to an outer diameter surface of the rod; the inner diameter surface of the cylinder is attached to the outer diameter of the rod. The method further includes engaging the protuberance formed on the second unidirectional bearing with the groove on the rod, creating a linear force in a first direction on the cylinder along the cylinder's center of axis, transferring the linear force from the protuberance to the rod, slidably displacing the rod a predetermined distance, and angularly rotating the rod a predetermined radial distance. The method may further include creating a linear force in a second direction on the rod along the cylinder's center of axis, wherein the second direction of the linear force is opposite the first direction of the linear force.

DETAILED DESCRIPTION OF THE PREFERRED EMBODIMENTS

Figure 1:
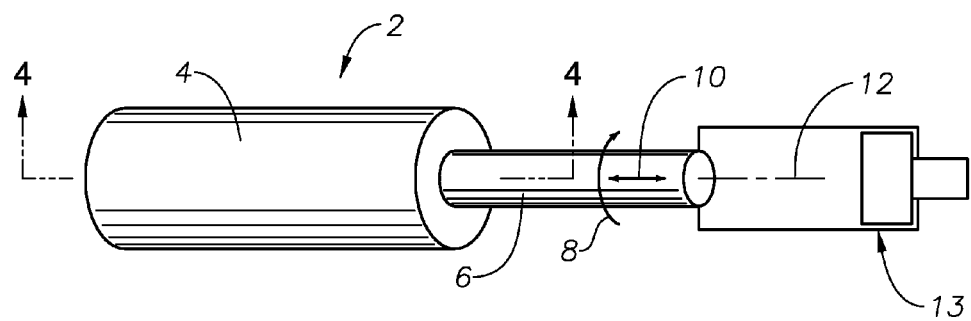
FIG. 1 is a schematic illustration of one embodiment of the apparatus of the present invention.

Referring now to FIG. 1, a schematic illustration of one embodiment of the apparatus 2 of the present disclosure will now be described. The apparatus 2 includes a cylinder 4 that has a rod 6 partially disposed therein. The cylinder 4 may be referred to as a motion translator 4. As noted in FIG. 1, the output 8 is shown (one-way), wherein the output is the angular rotation around the rod 6 and the input 10 (bi-directional) is the reciprocating linear motion along the axis 12 as will be described later in the description. A force generator 13 (such as a hydraulic piston) may be connected to the rod 6 for providing a bi-directional linear force input to the system.

Figure 2:
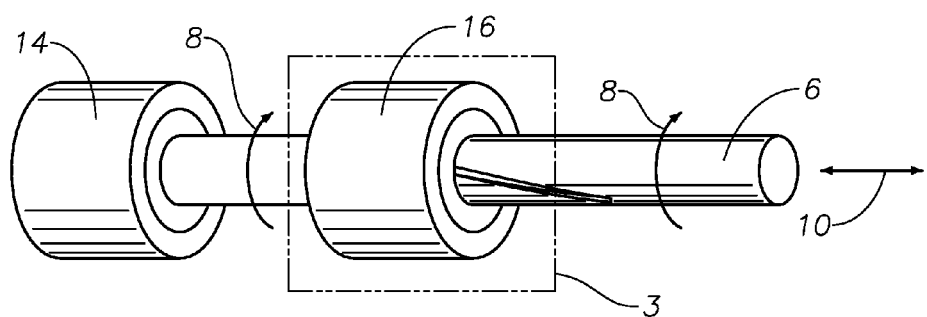
FIG. 2 is a partial sectional view of the apparatus illustrated in FIG. 1.

FIG. 2 is a partial sectional view of some of the components of the apparatus 2 illustrated in FIG. 1. FIG. 2 depicts the rod 6 concentrically disposed within unidirectional bearings therein. It should be noted that like numbers refer to like components in the various drawings. The sectional view of FIG. 2 depicts the internal bearing 14 and the internal bearing 16 wherein the bearings 14, 16 are unidirectional so that the bearings 14, 16 only rotate in a single direction, which is in the clockwise direction of the output arrows 8. The bearings 14 and 16 are commercially available from Ringspann under the name Internal Freewheels ZZ.

Figure 3:
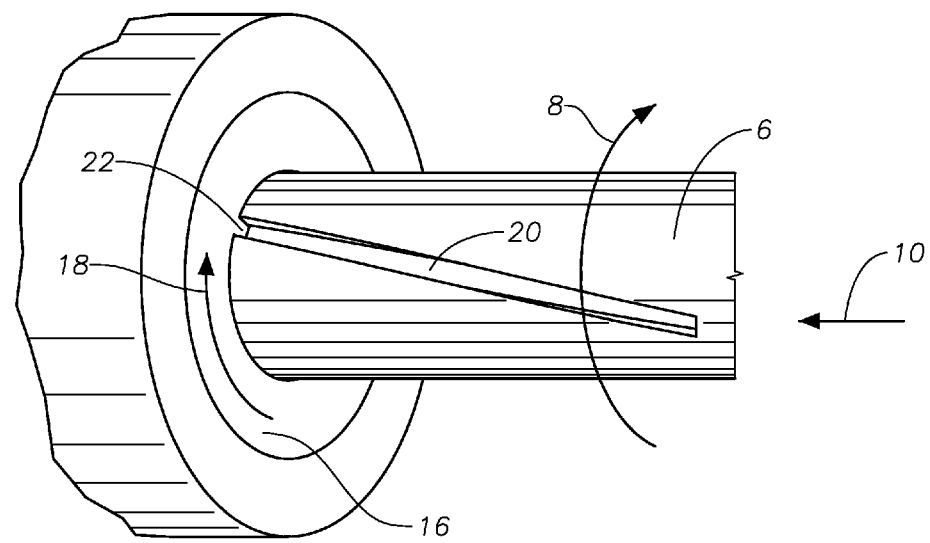
FIG. 3 is an enlarged view of the area "3" seen in FIG. 2.

Referring now to FIG. 3, an enlarged view of the area "3" seen in FIG. 2 will now be described. FIG. 3 depicts the bearing RB 16 along with the unidirectional arrow 18 which depicts the clockwise rotation of the bearing 16. The bearing 16 is concentrically disposed within the cylinder 4 (not seen in this view), and the rod 6 is concentrically disposed within the bearing RB 16, as previously disclosed. FIG. 3 also depicts the path 20 wherein the path 20 is a groove on the surface of the rod 6. The path 20, in one embodiment, is a predetermined curved groove as will be further explained later in the description. The bearing 16 will have a protuberance 22, sometimes referred to as a notch, formed thereon, and the protuberance 22 will engage the path 20 so that an input 10, which consist of a linear motion, will create an output 8 that is an angular motion, as will be more fully described later in the description.

The rotational angular movement per cycle is determined by the motion program seen generally in FIGS. 2 and 3. The motion program includes the bearing 14, the bearing 16, the rod 6, the cylinder 4, the path 20 and the protuberance 22. As noted earlier, the unidirectional bearings 14, 16 are placed such that both bearings 14, 16 provide the same unidirectional rotation to the rod 6.

Figure 4A:
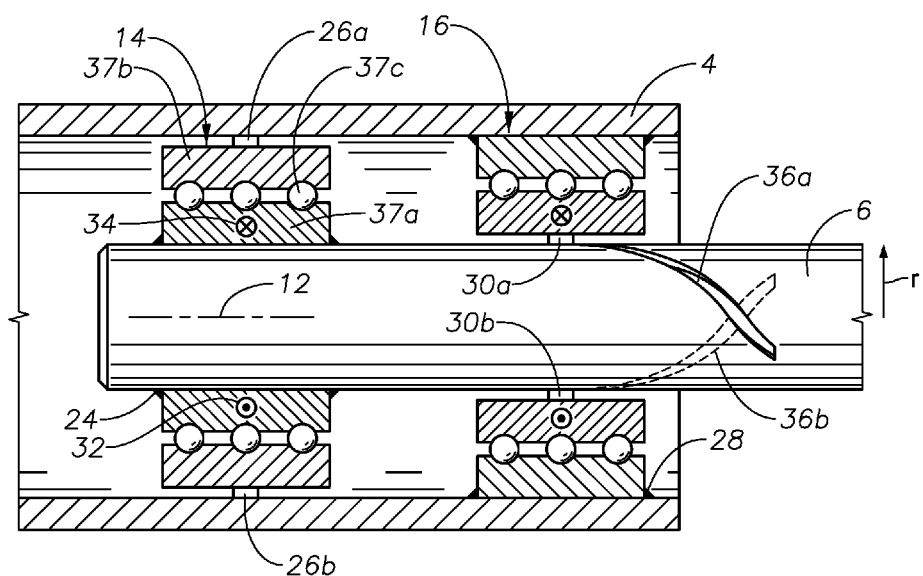
FIG. 4A is a cross-sectional view of one of the disclosed embodiments of the apparatus taken along line 4-4 of FIG. 1.

FIG. 4A is a cross-sectional view of the apparatus 2 taken along line 4-4 of FIG. 1. The bearing 14 is shown along with the bearing 16 disposed within an inner portion of the cylinder 4. The bearing 14 will be attached to the rod 6 with means for attachment 24, wherein the attachment means may be by welding the inner portion of the bearing 14 to the outer portion of the rod 6. Also, the outer portion of the bearing 14 will be slidably attached to the inner portion of the cylinder 4 with slidably attachment means 26a, 26b, wherein the slidably attachment means 26a and 26b may be a spline member or a tongue-in-groove member, for instance.

With respect to the bearing 16, the bearing 16 will be attached to the cylinder 4 with means for attachment 28, wherein the attachment means may be by welding the inner portion of the cylinder 4 to the outer portion of the bearing 16. Also, the inner portion of the bearing 16 will be slidably attached to the outer portion of the rod 6 with slidably attachment means 30a and 30b, wherein the slidably attachment means 30a, 30b may be, for instance, a spline member or a tongue-in-groove member. The slidably attachment means 30a, 30b allows for straight and parallel displacement along the rod and cylinder axis 12.

As noted earlier, the bearing 14 and 16 are unidirectional. FIG. 4A also depicts the direction of bearing rotation, wherein the "dot" within the circle 32 represents the bearing rotation in the direction of coming out of the drawing and the "X" in the circle 34 represents the bearing rotation in the direction going into the drawing.

FIG. 4A also shows the paths, seen generally at 36a and 36b, wherein the pair of paths 36a, 36b are placed onto the outer surface of the rod 6 at approximately 180° phase to each other. The paths 36a, 36b may also be referred to as grooves 36a and 36b. It should be noted that the apparatus 2 is operable with a single path, such as path 36a only. The radius "r" of the rod 6 is also seen in FIG. 4A. As per the teachings of this disclosure, the path 36a, 36b contain predetermined curves, wherein the paths 36a, 36b will enable incremental angular movement according to the motion program (which is also referred to as the motion assembly). Additionally, FIG. 4A depicts the cross-sectional view of the bearings 14, 16. For instance, bearing 14 has an inner cylindrical member 37a, an outer cylindrical member 37b, ball bearings 37c in between, and means for allowing only unidirectional bearing rotation, as well understood by those of ordinary skill in the art.

Figure 4B:
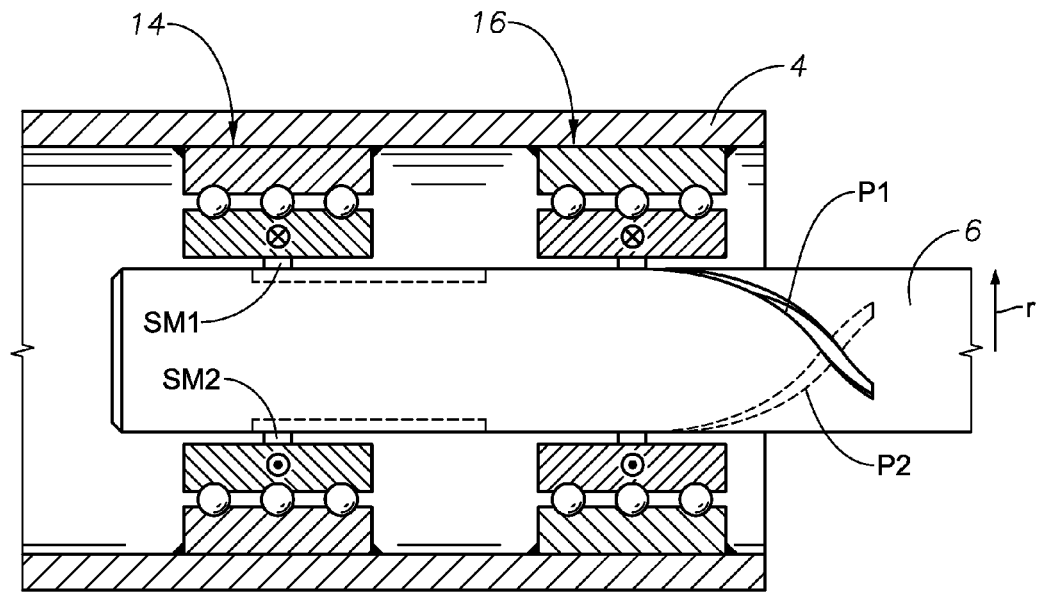
FIG. 4B is a cross-sectional view of a second embodiment of one of the disclosed embodiments of the apparatus taken along line 4-4 of FIG. 1.

FIG. 4B is a cross-sectional view of a second embodiment of one of the disclosed embodiments of the apparatus 2 taken along line 4-4 of FIG. 1. With the embodiment of FIG. 4B, the bearings 14, 16 are welded to the inner portion of the cylinder 4. The rod 6 is slidably attached to the inner portion of the bearing 14 with slide mechanisms SM1, SM2 for linear movement. The rod 6 is slidably attached to the inner portion of the bearing 16 for movement in accordance with the motion program, which is also referred to as the motion assembly, which includes the paths P1, P2. It should be noted that redundancies of similar components previously discussed, such as the bearings, attachment means, the slide mechanism grooves and notches will not be repeated in detail with the description of FIGS. 4B, 4C and 4D.

Figure 4C:
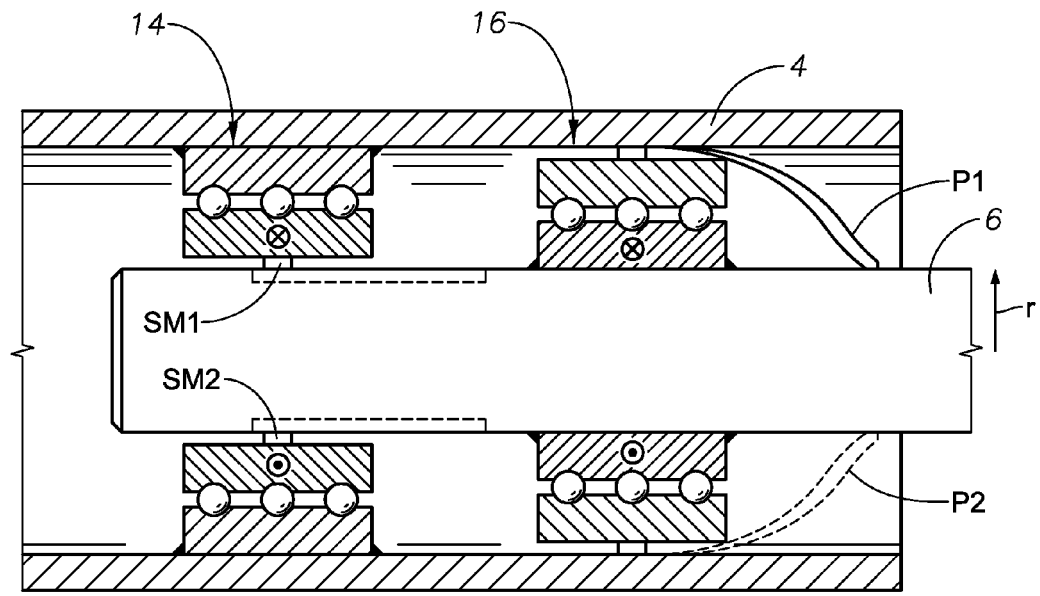
FIG. 4C is a cross-sectional view of a third embodiment of one of the disclosed embodiments of the apparatus taken along line 4-4 of FIG. 1.

FIG. 4C is a cross-sectional view of a third embodiment of one of the disclosed embodiments of the apparatus 2 taken along line 4-4 of FIG. 1. With this embodiment, the bearing 14 is attached (i.e. welded) to the inner portion of the cylinder 4 and the inner portion of the bearing 14 is slidably attached with a slide mechanism SM1, SM2 to the rod 6 for linear movement. The inner portion of the bearing 16 is welded to the rod 6 and the outer portion of the bearing 16 is slidably attached to the inner part of the cylinder 4 with the motion assembly i.e. the paths P1, P2 are on the inner portion of the cylinder, and male notches are on the outer portion of bearing 16 as previously described.

Figure 4D:
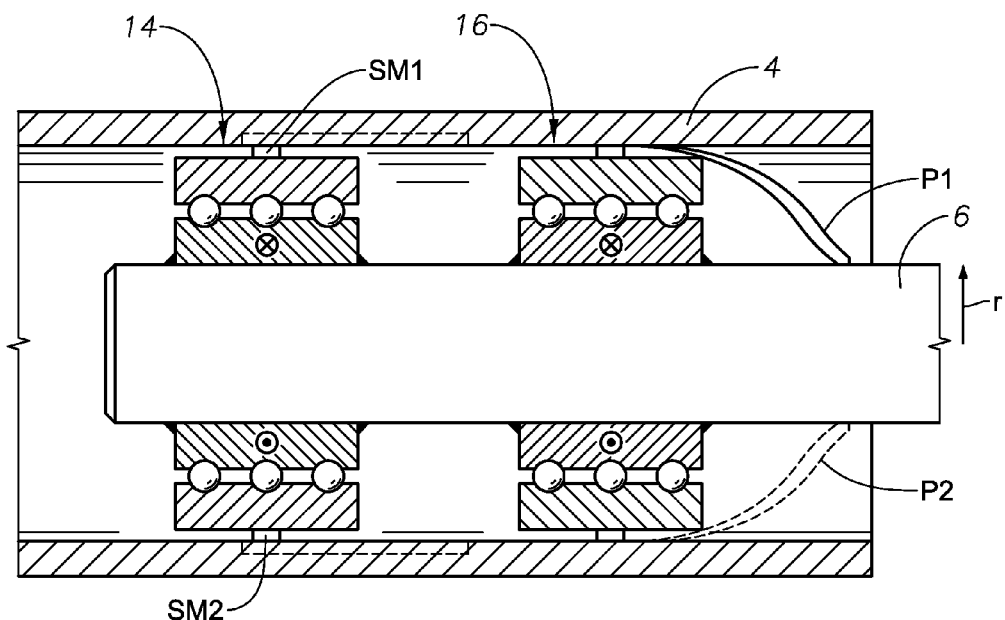
FIG. 4D is a cross-sectional view of a fourth embodiment of one of the disclosed embodiments of the apparatus taken along line 4-4 of FIG. 1.

Referring now to FIG. 4D, a cross-sectional view of a fourth embodiment of the present disclosure will now be described. With this embodiment, the bearing 14 is welded to the rod 6 and the bearing 14 is slidably attached to the inner portion of the cylinder 4 for linear movement. The bearing 16 is welded to the rod 6 and the bearing 16 is slidably attached to the inner portion of the cylinder 4, wherein the outer portion of the bearing 16 is slidably attached for movement in accordance with the motion assembly i.e. the paths P1, P2 are on the inner portion of the cylinder, and male notches are on the outer portion of bearing 16 as previously described.

Figure 5:
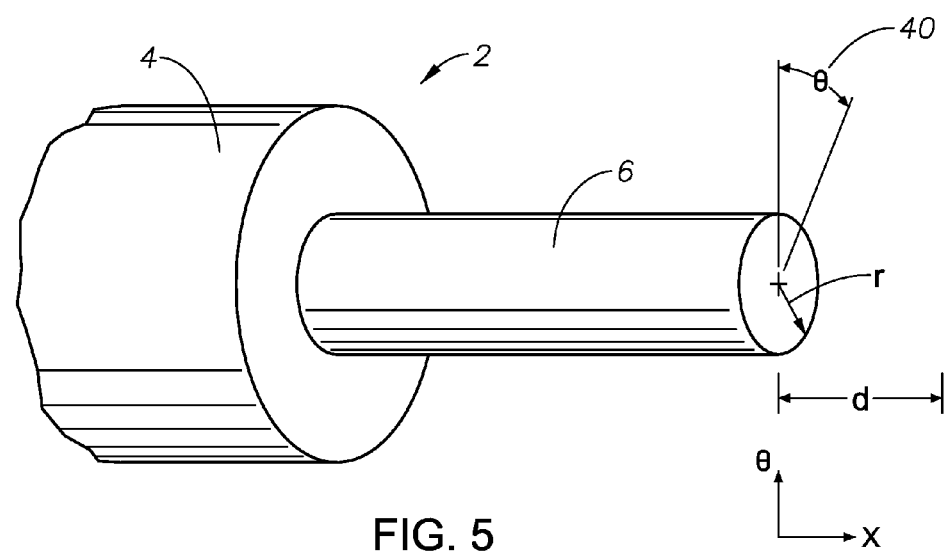
FIG. 5 is the schematic illustration of the apparatus seen in FIG. 1 with the angle of rotation theta shown.

Referring now to FIG. 5, a schematic illustration of the apparatus 2 seen in FIG. 1 with the angle of rotation will now be described. More specifically, the rod 6 is disposed within the cylinder 4. The radius "r" of the rod 6 is shown, and the angle theta 40 is shown, wherein in one embodiment the angle theta 40 is between slightly above zero (0) degrees to about ten (10) degrees. FIG. 5 also shows the displacement "d" of the rod 6, wherein the displacement "d" represents the amount of linear movement of the rod 6 in a half-cycle.

Figure 6A:
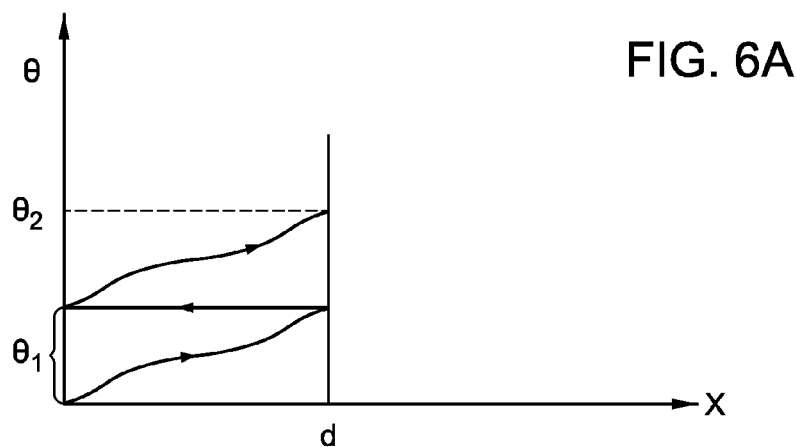
FIG. 6A is a graph of the displacement and the angle of rotation theta.

FIG. 6A is a graph of the displacement "d" and the angle of rotation theta. Hence, theta 1 is the angle of rotation during a first half cycle. An entire cycle consist of the angle rising to theta 1 (until the first half cycle for theta 1 is reached) then the displacement again reverts back to zero (for the second half cycle). FIG. 6A then shows that the angle incrementally increases to theta 2 for the start of another cycle, wherein the theta 2 corresponds to the displacement d.

Figure 6B:
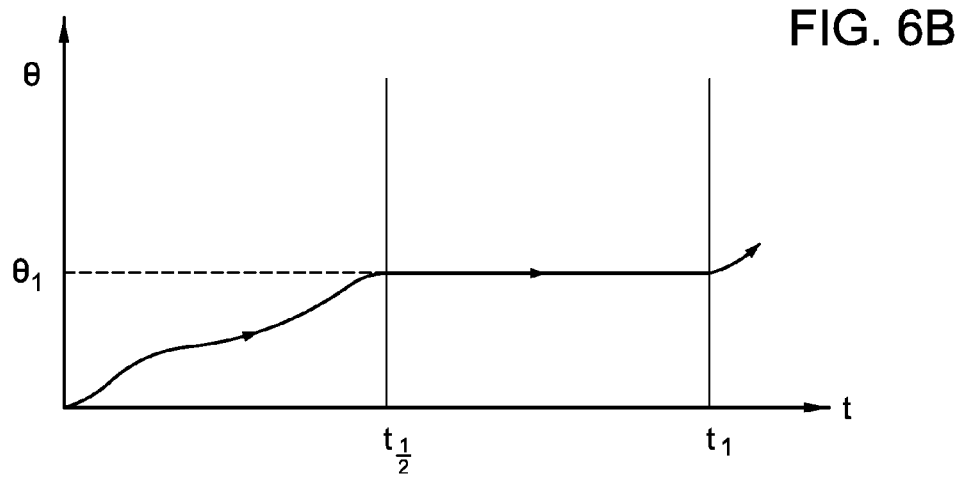
FIG. 6B is a graph of the angle of rotation and the time cycle of the system herein disclosed.

Referring now to FIG. 6B, a graph of the theta angle of rotation and the time cycle of the system is illustrated. More specifically, the time t/1;2 represents a half cycle and t1 represents a full cycle. Hence, the angle of rotation increases during the first half cycle to theta 1, while the angle theta 1 remains constant (i.e. unchanged) during the second half cycle.

Figure 6C:
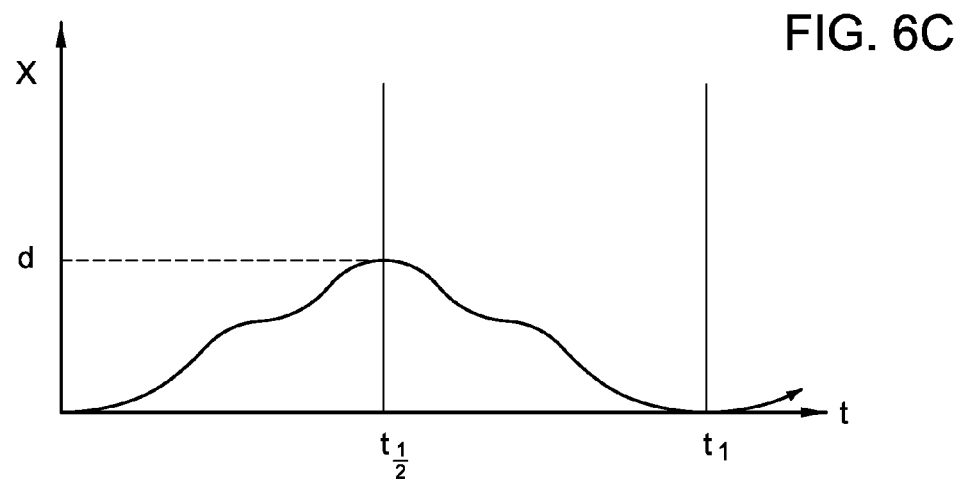
FIG. 6C is a graph of the displacement of the rod and one complete cycle of time for the system herein disclosed.

FIG. 6C is a graph of the displacement "d" of the rod 6 for one complete cycle of time for the system herein disclosed. Therefore, the displacement "d" rises during the first half cycle to "d", and during the second half cycle, the displacement "d" decreases back to zero by the end of a complete cycle.

With collective reference to FIGS. 1-6, the operation of the apparatus 2 will now be described. The movement of the rod 6 from left to right on the linear axial movement is called "forward" movement for the purpose of this description. This forward movement includes the displacement from the far most right to the far most left on FIG. 2. Therefore, "backward" displacement will be the exact opposite of the movement from the far most left to the far most right of the rod 6.

With reference to the forward movement, as the rod 6 linearly moves through the first unidirectional bearing 16, the male notch 22 on the bearing 16 will move within the path 20. Since the bearings 14 and 16 are unidirectional, when the path asserts the force on the notch 22, the component of the force that will try to move the bearings 14, 16 opposite to the uni-direction will be met with the resisting force from the bearing 14, 16 to the path 20. The remaining component of the force that is parallel to the cylinder 4 displacement the bearing will assert back the reaction forces and cancelled. Thus the resulting force will act on the cylinder 4 as a torque to turn the cylinder 4. The component of the force that follows in the direction of bearing rotation, the force will spent on turning the bearings 14, 16. For the case of the FIG. 3, the component of the force will torque the cylinder 4 to turn in the direction shown by the arrow in the diagram. The rotational direction show by the diagram is "clockwise" for the convention of this document.

Referring specifically to the embodiment of FIG. 4A, the clockwise motion will be explained Note that the bearing 16 is welded to the inner portion of the cylinder 4 at the outer portion of the bearing 16 whereas the bearing 14 is welded to the rod 6 at the inner bearing 14. In addition, the outer portion of the bearing 14 is designed to be able to slide along an inner portion of the cylinder 4 in conjunction with the linear displacement of the rod 6 but no angular motion of the bearing 14 with respect to the cylinder 4 is allowed.

Therefore, the clockwise motion of the rod 6 will turn the inside bearing of bearing 14 and the whole bearing 14 will slide linearly along with the rod 6.

When the rod 6 reaches the most left position, the angular motion of the rod 6 also stops. This is the end of a half cycle. The other half occurs during the backward movement.

With reference to the backward movement, as the rod 6 moves back from the most left position of the displacement, the path 20 on the rod 6 asserts a force (action) on the bearing 16 to turn clockwise. This is in the direction of the rotation for the bearing 16; the bearing 16 will turn but not the rod 6. The turning of the bearing 16, in the entire system, presents the least amount of force required in the return process. The rod 6 is tightly held by the bearing 14 system in place so that the rod 6 itself will not turn counterclockwise. This second bearing ensures that it is the bearing 14 turning clockwise even though there is force on the rod 6 to turn counterclockwise (reaction). The bearing 14 ensures that during the last half cycle, the rod 6 will maintain the same position in the angular position.

In the design of systems, designers find it necessary to control angular motion of members including tubular members. An application of the present disclosure includes a rod rotator that is installed inside a hydraulic pump that turns the rod string continuously in one direction while traveling up and down the well bore to reduce the wearing.

An aspect of one embodiment of the present disclosure is the apparatus and method translates a linear and reciprocating motion in the axial direction of the cylinder 4 into a unique unidirectional angular rotational motion of the same cylinder 4 around an axis 10, as seen in FIG. 1. The linear motion is reciprocating along a set distance. Another aspect of one embodiment is that each reciprocating motion completes with the design upper limits and lower limits of the distance that the cylinder travels in the axial direction. The angular rotation is around the axis 10 of the rod 6. In one preferred embodiment, the angular rotation is limited to between 1 degree and 10 degrees per cycle of linear motion. Yet another aspect of the present embodiments is the simplicity of the mechanical translation.

Yet another aspect of the disclosure is that the detailed motion program in the first cycle of theta is completely controlled by the path program designed on the surface of the rod 6. This is controlled by the machining quality of the time and mathematical definitions of relationships between theta and the displacement "d".

Although the present invention has been described in considerable detail with reference to certain preferred versions thereof, other versions are possible. Therefore, the spirit and scope of the appended claims should not be limited to the description of the preferred versions contained herein.

We claim:

1. An apparatus for imparting an angularly rotational movement comprising:
    a cylinder having an internal portion;
    a rod operatively positioned and movable within the internal portion of the cylinder, and a curved path positioned on the rod;
    a first unidirectional rotational bearing operatively positioned about the rod and rotating substantially only in a first direction;
    a second unidirectional rotational bearing operatively positioned about the rod and rotating substantially only in the first direction, and a portion of the second unidirectional rotational bearing in engagement with the path and configured to follow the path when the rod moves in the internal portion of the cylinder;
    a force generator coupled to the rod, the force generator, when operational, moving the rod linearly along an axis of the cylinder;
    wherein the path comprises a groove operatively placed on the rod;
    wherein the first unidirectional rotational bearing contains a spline member on an outer diameter surface, and wherein the spline member is operatively attached to an inner diameter surface of the cylinder; and wherein an inner diameter surface of the first unidirectional rotational bearing is attached to an outer diameter surface of the rod.

2. The apparatus of claim 1 wherein an outer diameter surface of the second unidirectional rotational bearing is attached to the inner diameter of the cylinder; and wherein the second unidirectional rotational bearing contains a spline member on an inner diameter surface, and wherein the spline member is operatively attached to the outer diameter surface of the rod.

3. The apparatus of claim 2 wherein the inner diameter surface of the first unidirectional rotational bearing is attached to the outer diameter surface of the rod by welding.

4. The apparatus of claim 3 wherein the outer diameter surface of the second unidirectional rotational bearing is attached to the inner diameter surface of the cylinder by welding.

5. The apparatus of claim 4 wherein the first direction is the clockwise direction.

6. The apparatus of claim 1 wherein the internal portion of the cylinder defines an interior surface, and wherein the second unidirectional rotational bearing is fixedly attached to the interior surface.

7. The apparatus of claim 1 wherein the portion of the second unidirectional rotational bearing in engagement with the path comprises a protuberance.

8. The apparatus of claim 1 wherein the first unidirectional rotational bearing is linearly moveable along an axis of the cylinder.

9. The apparatus of claim 8 where the first unidirectional rotational bearing is fixedly attached to the rod.

10. The apparatus of claim 1 wherein the groove comprises a first groove on the exterior surface of the rod.

11. The apparatus of claim 10 wherein the path further comprises a second groove on the exterior surface of the rod.

* * * * *